(No Model.)

G. P. FARMER.
BELT PIN.

No. 559,169. Patented Apr. 28, 1896.

Attest:
A. N. Jesbera.
Chas. E. Epworth.

Inventor:
George P. Farmer
by Redding & Kiddle
Attys.

UNITED STATES PATENT OFFICE.

GEORGE P. FARMER, OF MONTCLAIR, NEW JERSEY, ASSIGNOR TO THE CONSOLIDATED SAFETY PIN COMPANY, OF BLOOMFIELD, NEW JERSEY.

BELT-PIN.

SPECIFICATION forming part of Letters Patent No. 559,169, dated April 28, 1896.

Application filed February 14, 1896. Serial No. 579,240. (No model.)

*To all whom it may concern:*

Be it known that I, GEORGE P. FARMER, a citizen of the United States, residing in Montclair, in the county of Essex, State of New Jersey, have invented certain new and useful Improvements in Belt-Pins, &c., of which the following is a specification, reference being had to the accompanying drawings, forming a part hereof.

This invention relates particularly to the construction of safety-pins of that general class or description which are used as girdle or belt pins or for ornamental purposes and which require a face or front which is stiffer and broader than the wire of which the main body of the pin is composed.

The object of the invention is to provide improved means for securing the face or front of a sheet of metal or other material to the pin-wire. Usually such face or front plates have been secured to the pin-wire by means of solder; but this is objectionable for several reasons. In the first place, the solder is extremely liable to give way when the pin is in use. In the second place, the application of the solder draws the temper of the pin-wire, which is especially injurious to the pin when the solder is applied near the bend or spring-coil of the pin, as it must be in order to secure the face or front plate properly. In the third place, the solder is particularly objectionable if the pin is to be plated after construction, inasmuch as the solder not only does not itself take the plating well, but injures the plating-bath. I have sought, therefore, to avoid the use of solder altogether and at the same time to provide such means for securing the face or front plate to the pin-wire as shall prevent its accidental detachment and shall hold it from turning over upon the pin-wire. The improved construction will be described in detail hereinafter with reference to the accompanying drawings, in which—

Figure 1:
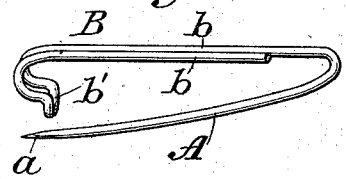
Figure 2:
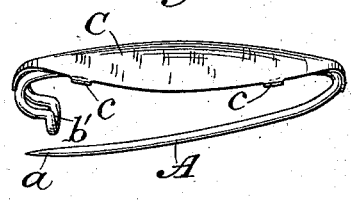
Figure 3:
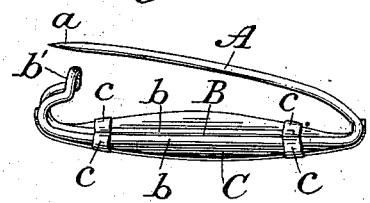
Figure 4:
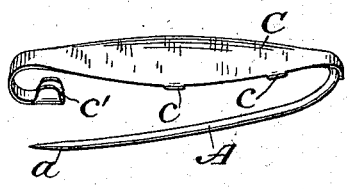
Figure 5:
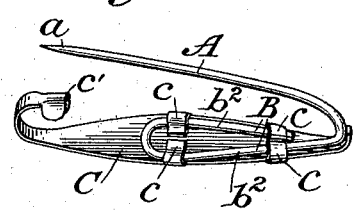

Figure 1 is a perspective view of the pin-wire without the face or front plate, the wire being formed in accordance with my invention. Fig. 2 is a perspective view of the completed pin from the upper side or face. Fig. 3 is a similar view from the under side. Figs. 4 and 5 are views similar to Figs. 2 and 3, but showing a slightly different form of the improved pin; and Fig. 6 is a view similar to Fig. 1, but having the pin-wire with a spring-coil.

Figure 6:
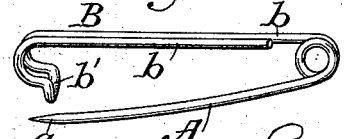

As represented in Figs. 1 and 6, the wire of which the body of the pin is formed is bent to form a movable or pin portion A, having a pin-point $a$ and a back B. The wire which forms the member B is doubled upon itself to form two members $b\ b$ in substantially the same plane. As represented in Figs. 1, 2, 3, and 6, the two members $b\ b$ are extended beyond the sheet-metal or other face or front plate C and are bent to form the hood or hook $b'$ with which the pin-point $a$ is engaged. The face or front plate C is usually made of sheet metal and is given such form as may be desired. It is provided with lugs or ears $c\ c$ on the opposite edges thereof, which may be bent inward upon the members $b\ b$ of the wire back B to engage the same and thereby to secure said face or front plate C to the wire body of the pin, and, through its engagement with the two members $b\ b$, to be held from turning upon the wire. It will be observed that the face or front plate C stiffens and supports the wire back B and shares the strain which may be placed upon it while in use, and, furthermore, that the parts are more securely held together than would be possible with solder, unless an excessive amount is employed, while the objections incident to the use of solder are wholly obviated.

It will be obvious that the hood or hook for engagement with the pin-point $a$ might be formed integral with the face or front plate C itself, as represented at $c'$ in Figs. 4 and 5. In this case the wire of the pin-body is bent back upon itself to form two members in substantially the same lateral plane, as at $b^2\ b^2$, but is not extended to form a hood or hook. The face or front plate C is provided, as before, with lugs or ears $c\ c$ on the opposite edges to be bent in and engaged severally with the aforesaid wire members $b^2\ b^2$. It will be evident that this form of the improved pin possesses the same advantages as have been ascribed to the form shown in Figs. 1, 2, and 3, and that it is mainly a matter of preference whether one form or the other shall be used.

I claim and desire to secure by Letters Patent—

1. In a belt-pin or other pin of like character, the combination with a wire pin-body having the back wire bent upon itself to form two members in substantially the same plane, of a face or front plate to be applied to said pin-body and having lugs or ears on its opposite edges bent inward to engage severally said wire members, substantially as shown and described.

2. In a belt-pin or other pin of like character, the combination with a wire pin-body having the back wire bent upon itself to form two members in substantially the same plane and extended and bent to form a hood or hook for engagement with the pin-point, of a face or front plate applied to said pin-back wire and having lugs or ears on its opposite edges bent inward to engage severally said wire members, substantially as shown and described.

This specification signed and witnessed this 13th day of February, A. D. 1896.

GEORGE P. FARMER.

In presence of—
  A. N. JESBERA,
  W. B. GREELEY.